United States Patent
Dobashi (10) Patent No.: US 11,068,117 B2
(45) Date of Patent: Jul. 20, 2021

(54) TABLET

(71) Applicant: Wacom Co., Ltd., Saitama (JP)

(72) Inventor: Kei Dobashi, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/228,329

(22) Filed: Dec. 20, 2018

(65) Prior Publication Data

US 2019/0196627 A1     Jun. 27, 2019

(30) Foreign Application Priority Data

Dec. 26, 2017    (JP) .............................. JP2017-249857

(51) Int. Cl.
| | |
|---|---|
| *G06F 3/046* | (2006.01) |
| *G06F 1/16* | (2006.01) |
| *G06F 3/041* | (2006.01) |
| *G06F 3/0354* | (2013.01) |
| *G06F 3/038* | (2013.01) |

(52) U.S. Cl.
CPC ............ *G06F 3/046* (2013.01); *G06F 1/1626* (2013.01); *G06F 1/1643* (2013.01); *G06F 3/038* (2013.01); *G06F 3/03545* (2013.01); *G06F 3/0416* (2013.01)

(58) Field of Classification Search
CPC .... G06F 3/03545; G06F 3/038; G06F 3/0416; G06F 3/046; G06F 1/1626; G06F 1/1643
USPC ......................................................... 345/173
See application file for complete search history.

(56) References Cited

U.S. PATENT DOCUMENTS

| | | | |
|---|---|---|---|
| 2005/0280638 A1* | 12/2005 | Oda ........................ | G06F 3/046 345/173 |
| 2006/0164402 A1* | 7/2006 | Tobari ..................... | G06F 3/046 345/173 |
| 2006/0267580 A1* | 11/2006 | Fukushima ........... | G06F 3/0416 324/207.13 |

FOREIGN PATENT DOCUMENTS

| | | |
|---|---|---|
| JP | H08161100 A | 6/1996 |
| JP | 2002244806 A | 8/2002 |
| JP | 2003202955 A | 7/2003 |
| JP | 2003204231 A | 7/2003 |
| JP | 2006004232 A | 1/2006 |
| JP | 2007004495 A | 1/2007 |

* cited by examiner

*Primary Examiner* — Jason M Mandeville
(74) *Attorney, Agent, or Firm* — Seed IP Law Group LLP (57) ABSTRACT

A tablet supplies energy to a stylus including a resonant circuit including a coil and a capacitor by using an alternating magnetic field. The tablet includes a sensor coil group including plural sensor coils, a switch connected to the sensor coil group, a receiver that receives a pen signal transmitted by the stylus and provided to the sensor coil group through the switch, a transmitter that generates the alternating magnetic field by supplying a signal to the sensor coil group through the switch, and a control circuit that supplies a transmission signal to the transmitter and receives input of the pen signal from the receiver. The transmitter includes an amplifying circuit that supplies the sensor coil group with a voltage-amplified signal. The control circuit alternately performs a first control operation and a second control operation that control the switch.

9 Claims, 6 Drawing Sheets

TABLET

BACKGROUND

Technical Field

The present disclosure relates to a tablet and particularly to a tablet that carries out communication with a position indicator based on an electromagnetic exchange system.

Background Art

An electromagnetic exchange system exists as one of systems for detecting the position of a position indicator (pen, cursor, or the like) over a panel surface of a tablet. In this system, plural loop coils are juxtaposed in a position detecting surface of the tablet. The tablet generates an alternating magnetic field over the panel surface by sending out a signal from at least one or more of these loop coils. The position indicator includes a resonant circuit, and power is generated in the position indicator when the position indicator enters this alternating magnetic field. The tablet detects the position of the position indicator by receiving, by the respective loop coils, a signal (pen signal) transmitted by the position indicator by using the power thus generated.

Two methods are known as concrete scanning methods of the plural loop coils. The first method is a method in which attention is sequentially paid to the individual loop coils and, every time attention is paid, both alternating magnetic field generation and pen signal reception are carried out by using the loop coil to which attention is paid. The first method is depicted in FIG. 4A of Japanese Patent Laid-open No. Hei 8-161100 for example. Hereinafter, this method will be referred to as the "first scanning method." Furthermore, the period necessary to end one round of reception operation about all loop coils disposed in the tablet will be referred to as the "scan cycle."

The second method is a method different from the first scanning method in that alternating magnetic field generation is carried out from the same loop coil always during one scan cycle, and is depicted in FIG. 4B of Japanese Patent Laid-open No. Hei 8-161100 for example. Hereinafter, this method will be referred to as the "second scanning method." As the loop coil used for the generation of the alternating magnetic field in the second scanning method, the loop coil depicted to be the closest to the position indicator based on a result of pen signal reception in the previous scan cycle is selected.

A sine wave signal can be used as a signal sent out by the tablet for generating the alternating magnetic field. Regarding this, an example of the tablet that sends out the sine wave signal is disclosed in Japanese Patent Laid-open No. 2002-244806 for example. In this example, a rectangular wave signal A output from a signal generating circuit 31 is converted to a sine wave signal E by a low-pass filter that is not depicted in the diagram, and is supplied to loop coils in a tablet 20.

Furthermore, normally a constant current drive circuit is used as a drive circuit of the signal sent out by the tablet for generating the alternating magnetic field. This is because the level of the generated alternating magnetic field depends on the value of the current that flows in the loop coil and therefore using the constant current drive circuit can align the levels of alternating magnetic fields generated by the respective loop coils even when the resistance values of the respective coils are different due to difference in the length of the wiring line or variation in terms of manufacturing.

Examples of the tablet using the constant current drive circuit are disclosed in Japanese Patent Laid-open No. 2006-4232, No. 2003-204231, No. 2007-4495, and No. 2003-202955.

Incidentally, in the case of using the constant current drive circuit as the drive circuit of the signal sent out by the tablet for generating the alternating magnetic field, a problem that the level of the alternating magnetic field received by a stylus is suppressed to a low level occurs. A detailed description will be made below.

Normally the loop coil is connected to a capacitor in series to form a series resonant circuit. When a current is supplied from the constant current drive circuit to this series resonant circuit, the capacitor is charged at the start of the supply and a direct current (DC) voltage corresponding to this charging is superimposed on the voltage across the series resonant circuit. As a result, the respective constituent components (particularly switch used for switching of the loop coil) of a transmitting circuit immediately become saturated and thus the level of the alternating magnetic field received by the stylus cannot be raised as desired.

Furthermore, an output circuit of the drive circuit including the constant current drive circuit is generally formed of a complementary metal-oxide semiconductor (CMOS). In the constant current drive circuit, in order to leave room for fine adjustment of the output current, it is impossible to set each transistor forming this CMOS to the on- or off-state completely. As a result, the output voltage of the constant current drive circuit is compelled to become a voltage lower than the voltage across the CMOS (for example 3.3 V). This is none other than the state in which the output power (=level of the alternating magnetic field received by the stylus) that should be allowed to be yielded originally is not yielded.

Moreover, if an input signal to the constant current drive circuit is a rectangular wave signal, the output voltage of the constant current drive circuit often temporarily becomes high at the rising and falling of the rectangular wave signal. In this case, the output power of the constant current drive circuit (=level of the alternating magnetic field received by the stylus) is compelled to be suppressed so that the input voltage of the subsequent-stage circuit (particularly switch used for switching of the loop coil) may be prevented from surpassing the rated voltage.

As one of methods to solve the above-described problems and improve the level of the alternating magnetic field generated by the tablet, using an amplifying circuit instead of the constant current drive circuit is conceivable. Using an amplifying circuit can avoid the above-described problems that occur with the constant current drive circuit and thus improve the level of the alternating magnetic field. On the other hand, if the amplifying circuit is used instead of the constant current drive circuit, the above-described merits of the constant current drive circuit cannot be enjoyed and the level of the alternating magnetic field generated by each loop coil varies.

BRIEF SUMMARY

Therefore, one of objects of the present disclosure is to keep the level of an alternating magnetic field received by a stylus constant and allow execution of amplification with which use up to the limit of the rated voltage of a switch is possible for example.

A tablet according to the present disclosure is a tablet supplies energy to a stylus including a resonant circuit including a coil and a capacitor by using an alternating magnetic field. The tablet includes a sensor coil group including a plurality of sensor coils, a switch connected to the sensor coil group, a receiver which, in operation, receives a pen signal that is transmitted by the stylus and provided to the sensor coil group through the switch, a transmitter which, in operation generates the alternating magnetic field by supplying a signal to the sensor coil group through the switch, and a control circuit which, in operation, supplies a transmission signal to the transmitter and receives input of the pen signal from the receiver. The transmitter includes an amplifying circuit which, in operation, supplies the sensor coil group with a voltage-amplified signal obtained by amplifying the transmission signal supplied from the control circuit in such a manner that a maximum amplitude falls within a rated voltage of the switch. The control circuit is configured to alternately carry out a first control operation of controlling the switch to cause one of the plurality of sensor coils to be connected to the receiver and a second control operation of controlling the switch to cause predetermined at least one sensor coil in the plurality of sensor coils to be connected to the transmitter.

According to the present disclosure, because the amplifying circuit is used for the transmitter, the level of the alternating magnetic field can be improved compared with the case of using a constant current drive circuit. In addition, although the sensor coil used for reception of the pen signal changes, the sensor coil used for transmission of the transmission signal does not change (above-described second scanning method). Thus, the level of the alternating magnetic field can be kept constant. Therefore, the level of the alternating magnetic field received by the stylus can be made constant without using the constant current drive circuit and it becomes possible to carry out amplification with which use up to the limit of the rated voltage of the switch is possible, for example.

DETAILED DESCRIPTION

An embodiment of the present disclosure will be described in detail below with reference to the accompanying drawings.

Figure 1:
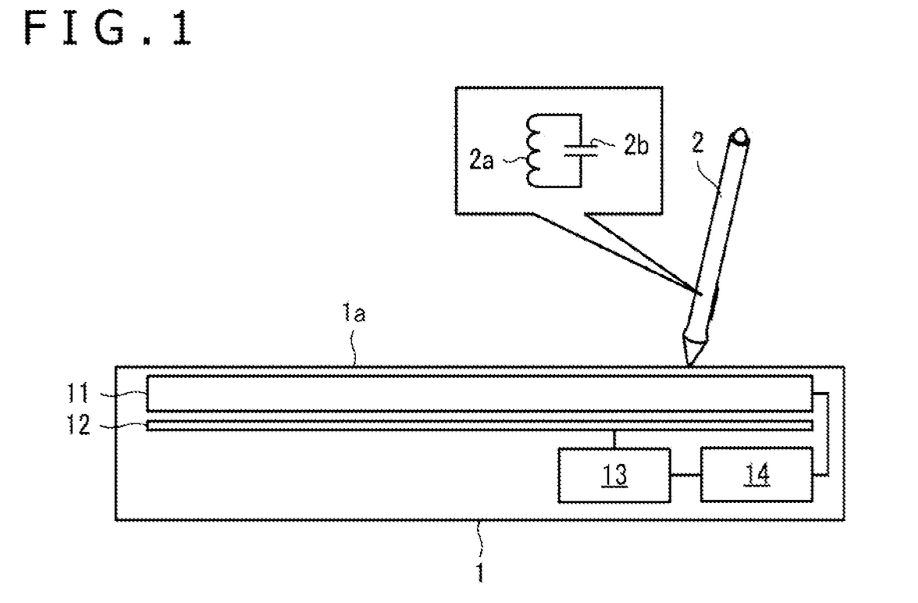
FIG. 1 is a diagram depicting the configuration of a tablet 1 according to an embodiment of the present disclosure.
Figure 2:
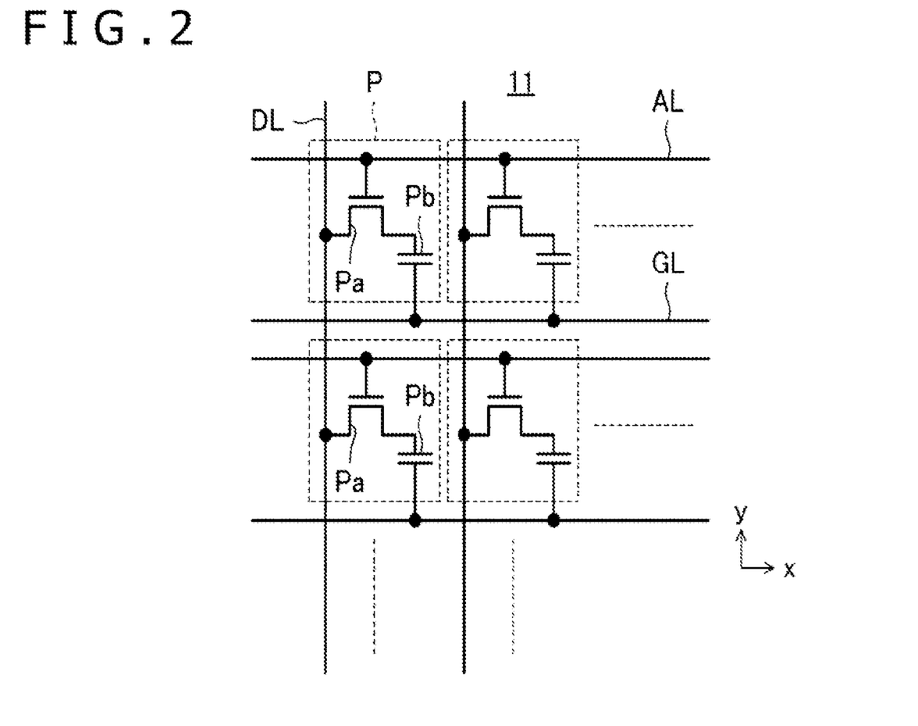
FIG. 2 is a diagram depicting the configuration of a display device 11 depicted in FIG. 1 in detail.
Figure 3:
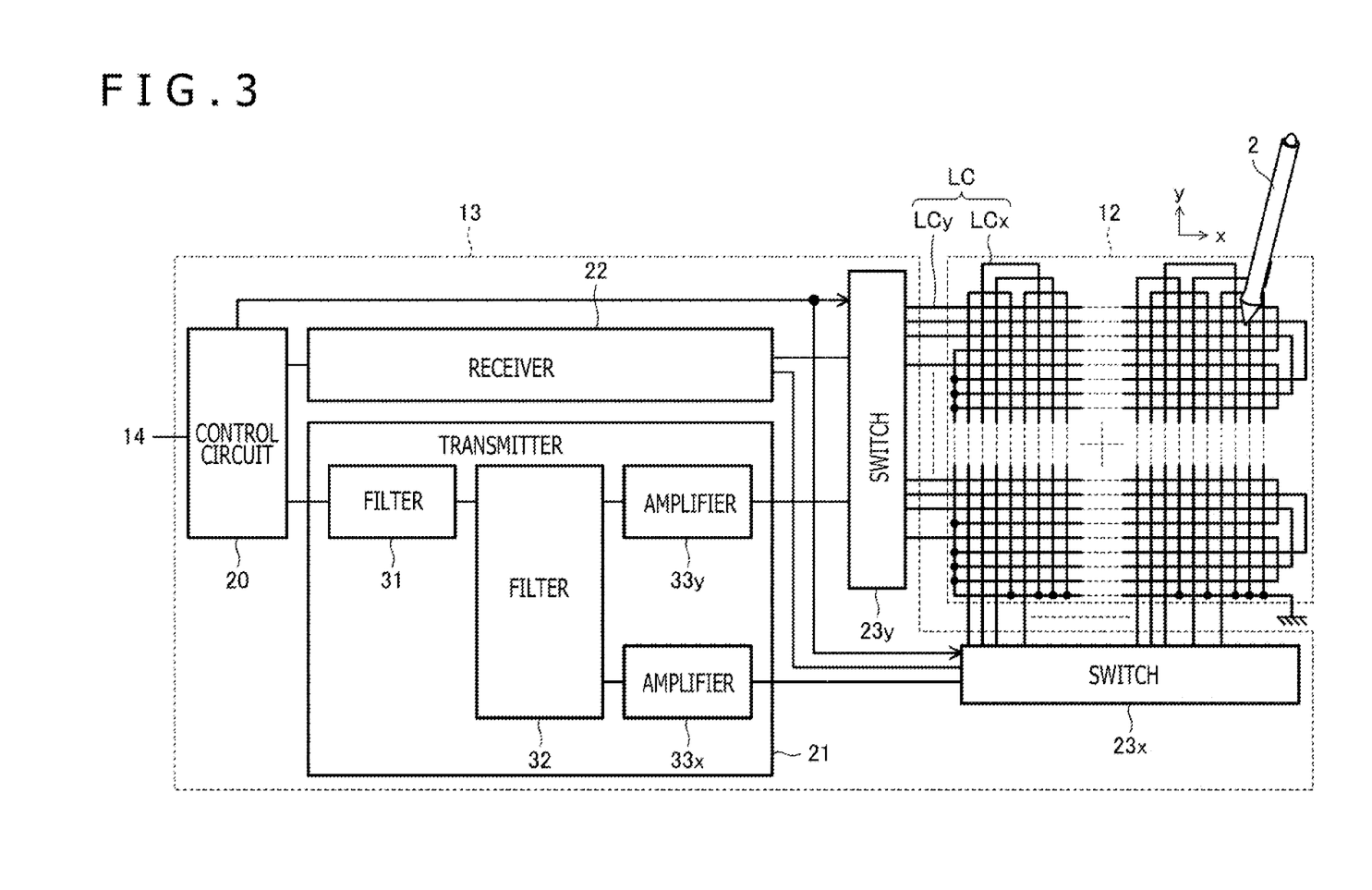
FIG. 3 is a diagram depicting the configuration of a sensor coil group 12 and a sensor controller 13 depicted in FIG. 1 in detail.

FIG. 1 is a diagram depicting the configuration of a tablet 1 according to an embodiment of the present disclosure. This diagram schematically depicts a section of the tablet 1. As depicted in this diagram, the tablet 1 includes a display device 11, a sensor coil group 12, a sensor controller 13, and a host processor 14. FIG. 2 is a diagram depicting the configuration of the display device 11 among them in detail and FIG. 3 is a diagram depicting the configuration of the sensor coil group 12 and the sensor controller 13 in detail.

The display device 11 is a display device in which plural scan lines are disposed to each extend along an x-direction depicted in FIG. 2 (first direction in the display surface) and is configured to be capable of displaying an arbitrary image on the display surface according to control by the host processor 14. In a concrete example, the display device 11 is formed of a liquid crystal display, organic electroluminescence (EL) display, or the like of an active matrix system or passive matrix system. The display device 11 is disposed in such a manner that the display surface is parallel to a panel surface 1a of the tablet 1 depicted in FIG. 1.

As depicted in FIG. 2, the display device 11 includes plural address lines AL that each extend along the x-direction and are juxtaposed in a y-direction (second direction orthogonal to the first direction in the display surface), plural data lines DL that each extend along the y-direction and are juxtaposed in the x-direction, and a common potential line GL to which a ground potential is supplied. One pixel P is disposed at each intersection of a respective one of the address lines AL and a respective one of the data lines DL.

In FIG. 2, the display device 11 based on an example of the active matrix system is depicted. A transistor Pa and a liquid crystal element Pb are included in the pixel P in this case as depicted in this diagram. The gate electrode of the transistor Pa is connected to the corresponding address line AL. One controlled electrode is connected to the corresponding data line DL and the other controlled electrode is connected to one electrode (pixel electrode) of the liquid crystal element Pb. The other electrode (common electrode) of the liquid crystal element Pb is connected to the common potential line GL.

The display device 11 is configured to control the display state of each pixel P by activating any address line AL according to control from the host processor 14 and, in this state, supplying a video signal supplied from the host processor 14 to each data line DL. By this control, display according to control by the host processor 14 is implemented.

Next, as depicted in FIG. 3, the sensor coil group 12 includes plural sensor coils LC that are each a conductor formed into a loop shape. The plural sensor coils LC include plural sensor coils LCy (first sensor coils) that are each connected to a switch 23y to be described later at one end in the x-direction and plural sensor coils LCx (second sensor coils) that are each connected to a switch 23x to be described later at one end in the y-direction. The plural sensor coils LC are disposed on the lower side of the display device 11 (on the opposite side to the panel surface 1a across the display device 11) as depicted in FIG. 1.

The shape of each sensor coil LC will be described more specifically. First, the plural sensor coils LCy each include two conductors that extend along the x-direction in the panel surface and a conductor that connects these two conductors to each other at one end in the x-direction. The other end of one of the two conductors in the x-direction is connected to the switch 23y and the other end of the other in the x-direction is grounded or is grounded only at the time of transmission. Next, the plural sensor coils LCx each include two conductors that extend along the y-direction in the panel surface and a conductor that connects these two conductors to each other at one end in the y-direction. The other end of one of the two conductors in the y-direction is connected to the switch 23*x* and the other end of the other in the y-direction is grounded or is grounded only at the time of transmission.

The sensor controller 13 is a device configured to be capable of controlling a stylus 2 through the sensor coil group 12 and includes a control circuit 20, a transmitter 21, a receiver 22, and the switches 23*x* and 23*y* as depicted in FIG. 3.

The control circuit 20 is an integrated circuit having a function of controlling respective components of the sensor controller 13 in accordance with control by the host processor 14. Specifically, the control circuit 20 is configured to receive a transmission signal that should be transmitted to the stylus 2 from the host processor 14 and supply the transmission signal to the transmitter 21, and to receive input of a pen signal (what is transmitted by the stylus 2 that has received the transmission signal) from the receiver 22 and executes processing according to the contents thereof. In the processing according to the contents of the pen signal, processing of decoding the pen signal and supplying the result thereof to the host processor 14 is included.

Furthermore, the control circuit 20 is configured to alternately carry out or perform a reception operation (first control operation) of controlling the switches 23*x* and 23*y* to cause one of the plural sensor coils LC to be connected to the receiver 22 and a transmission operation (second control operation) of controlling the switches 23*x* and 23*y* to cause predetermined one or more sensor coils LC among the plural sensor coils LC to be connected to the transmitter 21. Regarding this point, a more detailed description will be made later with reference to FIGS. 4A to 4C. The reception operation is carried out in such a manner that all of the plural sensor coils LC are connected to the receiver 22 one time for each sensor coil LC in the above-described one scan cycle.

The transmitter 21 plays a role in generating an alternating magnetic field over the sensor coil group 12 by supplying a transmission signal to the sensor coil group 12 through the switch 23*y*. The transmitter 21 includes filters 31 and 32 and amplifiers 33*x* and 33*y* as depicted in FIG. 3. Details of them will be described in detail later.

Here, as depicted in FIG. 1, the stylus 2 includes a resonant circuit including a coil 2*a* and a capacitor 2*b*. The coil 2*a* and the capacitor 2*b* may be connected in series in a circuit of the stylus 2 that is not depicted in the diagram or may be connected in parallel. When the coil 2*a* enters an alternating magnetic field generated by the transmitter 21, a current is generated in the resonant circuit. The stylus 2 is configured to use power generated due to this current to read out information from a memory that is not depicted in the diagram and modulate the information and transmit a pen signal obtained as the result of the modulation from the coil 2*a*.

Referring back to FIG. 3, the receiver 22 has a function of receiving the pen signal that is provided to the sensor coil group 12 as a result of the transmission by the stylus 2 in the above-described manner through the switches 23*x* and 23*y*. The receiver 22 is configured to demodulate the pen signal thus received and supply the pen signal to the control circuit 20.

The switch 23*x* is connected to each of the transmitter 21, the receiver 22, and the plural sensor coils LCx and is configured to selectively connect 0 or more of the plural sensor coils LCx to either one of the transmitter 21 and the receiver 22 according to control from the control circuit 20. Similarly, the switch 23*y* is connected to each of the transmitter 21, the receiver 22, and the plural sensor coils LCy and is configured to selectively connect 0 or more of the plural sensor coils LCy to either one of the transmitter 21 and the receiver 22 according to control from the control circuit 20.

The overall outline of the tablet 1 is described above. Next, feature parts of the present disclosure in the configuration of the tablet 1 will be described in detail.

Figure 4A:
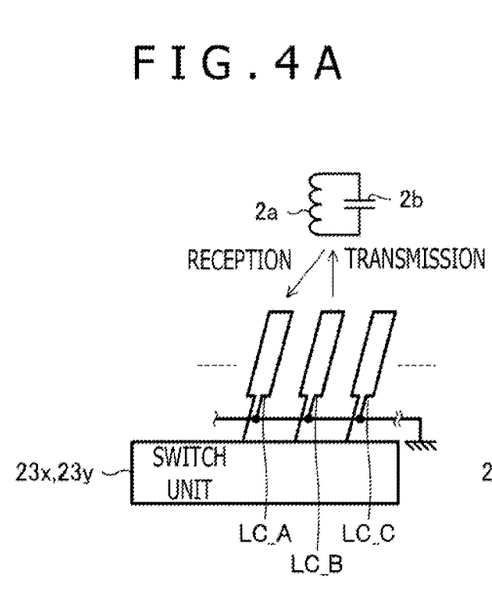
FIGS. 4A to 4C illustrate diagrams depicting a control method of switches 23x and 23y by a control circuit 20 depicted in FIG. 3.
Figure 4B:
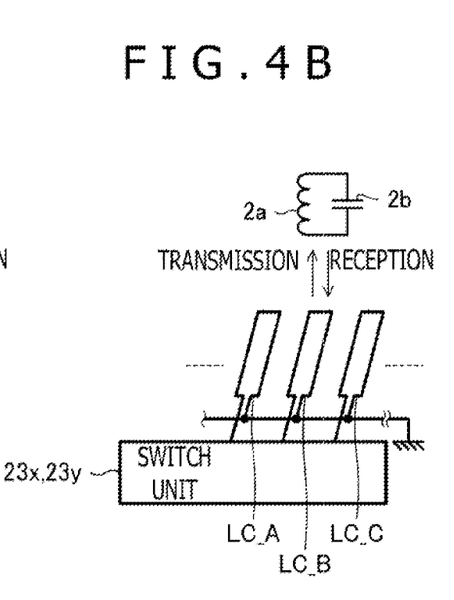
Figure 4C:
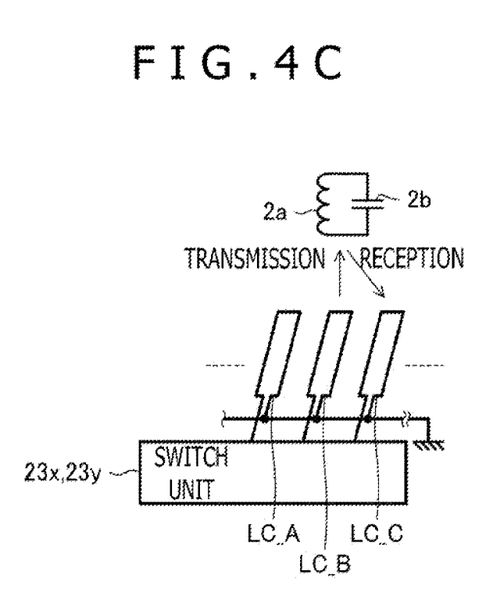

FIGS. 4A to 4C illustrate diagrams depicting a control method of the switches 23*x* and 23*y* by the control circuit 20. FIGS. 4A, 4B, and 4C each represent one round of repetitive operations of the control circuit 20 composed of a combination of the above-described transmission operation and reception operation. Sensor coils LC_A, LC_B, and LC_C depicted in FIGS. 4A to 4C are each a sensor coil LC depicted in FIG. 3. Although only the three sensor coils LC are exemplified in FIGS. 4A to 4C, actually a larger number of sensor coils LC are used.

As is understood from FIGS. 4A to 4C, the control circuit 20 in this example is configured to carry out the reception operation while sequentially selecting the sensor coils LC_A, LC_B, and LC_C whereas carry out the transmission operation by always using the sensor coil LC_B. This is none other than the above-described second scanning method. That is, the tablet 1 according to the present embodiment is configured to carry out generation of an alternating magnetic field and pen signal reception by the above-described second scanning method.

It is preferable for the control circuit 20 to select the sensor coil LC closest to the stylus 2 (for example, the sensor coil LC with the highest reception intensity of the pen signal) based on the pen signal supplied from the receiver 22 corresponding to each of the plural sensor coils LC every time the reception operation of one scan cycle is completed and carry out the transmission operation in the next scan cycle by using the selected sensor coil LC. This makes it possible to generate as large a current as possible in the resonant circuit in the stylus 2.

Furthermore, it is preferable to select the sensor coil LC used for carrying out the transmission operation from the plural sensor coils LCy connected to the switch 23*y* at the ends parts in the extension direction of the scan lines of the display device 11 (x-direction). Here, in general, in the case of carrying out the transmission operation from one of x-direction coil (for example, sensor coil LCx) and y-direction coil (for example, sensor coil LCy), the x-direction coil is used. This is because a shorter distance of the long side of the coil can be obtained with the x-direction coil and the impedance is lower as a result and therefore a larger output current can be obtained. In contrast, the reason why it is preferable to use the sensor coil LCy in the present disclosure is that noise caused in the display device 11 due to operation of the sensor coil group 12 is reduced.

Furthermore, although the example in which the transmission operation is carried out by using one sensor coil LC is depicted in FIGS. 4A to 4C, the control circuit 20 may carry out the transmission operation by using plural sensor coils LC. In this case, the control circuit 20 may carry out the transmission operation by using one of the plural sensor coils LCx and one of the plural sensor coils LCy. It is preferable to select the sensor coil closest to the stylus 2 as each of the sensor coils LCx and LCy used in this case.

Figure 5:
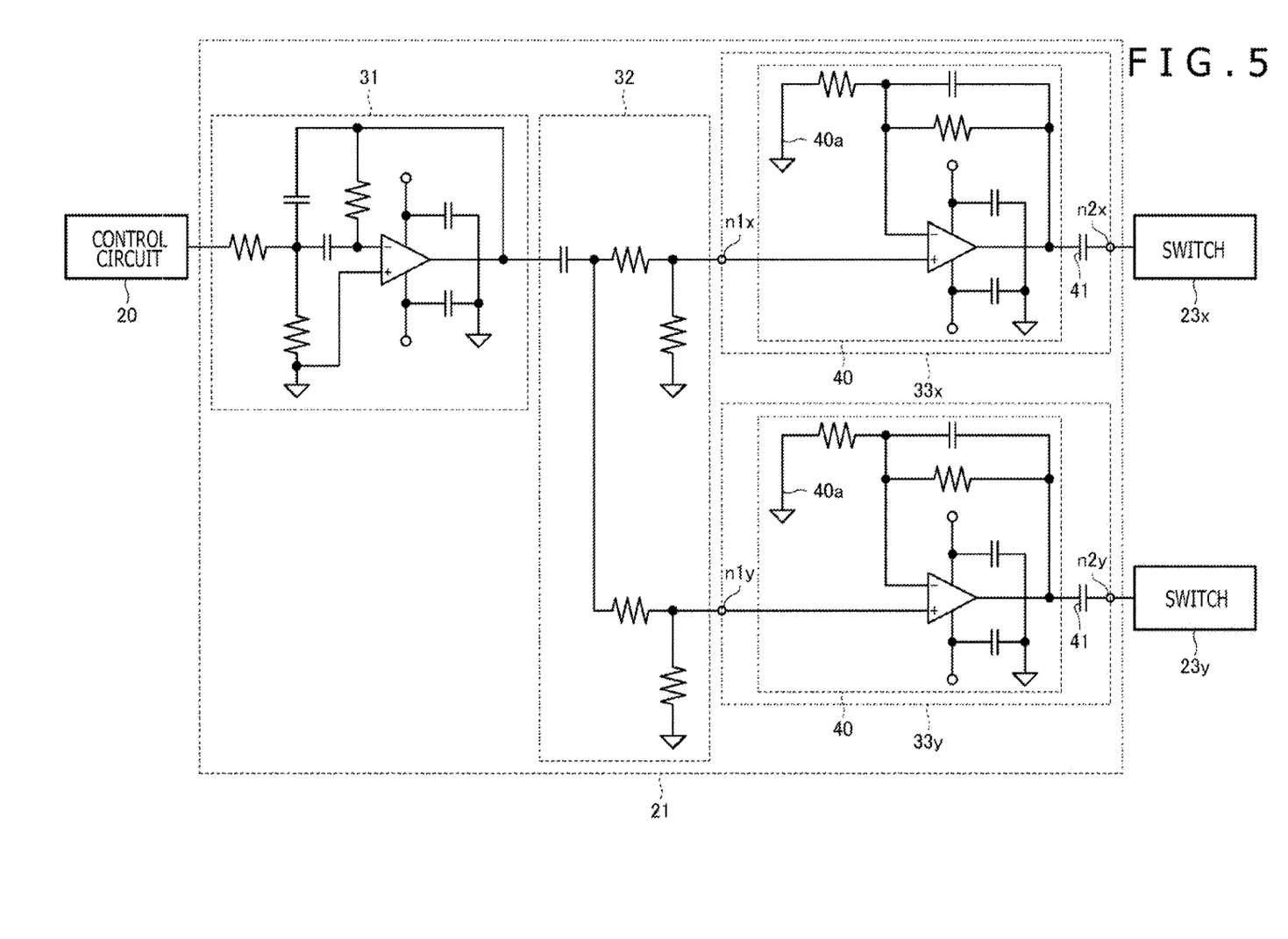
FIG. 5 is a diagram depicting the detailed configuration of respective components in a transmitter 21 depicted in FIG. 3.

Next, FIG. 5 is a diagram depicting the detailed configuration of the respective components in the transmitter 21.

The filters 31 and 32 are each a circuit disposed in order to limit the band of the transmission signal supplied from the control circuit 20 to the amplifiers 33*x* and 33*y*. Specifically, as depicted in FIG. 5, the filter 31 is formed of a band-pass filter of an operational amplifier multiple feedback type and the filter 32 is formed of a high-pass filter configured by using capacitors and resistive elements.

The filter 31 is disposed in common for the plural sensor coils LC. On the other hand, except for the capacitor part, the high-pass filter forming the filter 32 is disposed one by one corresponding to each of the plural sensor coils LCx and the plural sensor coils LCy. The capacitors forming the high-pass filter are disposed in common for the plural sensor coils LC.

A transmission signal is supplied from the control circuit 20 to the input terminal of the filter 31. The transmission signal thus supplied is a rectangular wave signal of a certain cycle. Although details will be described later, the filter 31 as the band-pass filter functions as a transient phenomenon suppressing component that suppresses a transient phenomenon that possibly occurs at the rising and falling of this rectangular wave signal. An output signal of the filter 31 is supplied to the input terminal of the filter 32.

The amplifier 33x is a circuit disposed corresponding to the plural sensor coils LCx and includes an amplifying circuit 40 (first amplifying circuit) configured as a non-inverting amplifying circuit and a capacitor 41 inserted between the output terminal of the amplifying circuit 40 and the switch 23x. Meanwhile, the amplifier 33y is a circuit disposed corresponding to the plural sensor coils LCy and includes an amplifying circuit 40 (second amplifying circuit) configured as a non-inverting amplifying circuit and the capacitor 41 inserted between the output terminal of the amplifying circuit 40 and the switch 23y similarly to the amplifier 33x.

In the following description, as depicted in FIG. 5, the input terminals of the amplifiers 33x and 33y will be referred to as nodes n1x and n1y, respectively, and the output terminals of the amplifiers 33x and 33y will be referred to as nodes n2x and n2y, respectively. However, if the nodes do not need to be particularly discriminated, the nodes n1x and n1y will be collectively referred to as the node n1 and the nodes n2x and n2y will be collectively referred to as the node n2 in some cases. As depicted in FIG. 5, the node n1x is connected to the x-side output terminal of the filter 32 and the node n1y is connected to the y-side output terminal of the filter 32. The node n2x is connected to the switch 23x and the node n2y is connected to the switch 23y.

The capacitors 41 in the amplifiers 33x and 33y each form a series resonant circuit with the sensor coil LC connected to the transmitter 21 by the switch 23x or 23y. According to this configuration, the capacitor 41 does not need to be disposed for each sensor coil LC and therefore the circuit scale of the sensor controller 13 can be made small.

The amplifying circuit 40 is disposed in the tablet 1 instead of the constant current drive circuit disposed in the tablets of the related arts. Due to the use of the amplifying circuit 40 instead of the constant current drive circuit, various kinds of problems that occur with the above-described constant current drive circuit are solved according to the tablet 1 in accordance with the present embodiment. Specifically, it is possible to avoid the occurrence of a state in which the respective components (particularly switches 23x and 23y) in the sensor controller 13 become saturated due to a DC voltage superimposed on the voltage across the series resonant circuit formed of the capacitor 41 and the sensor coil LC and the level of the alternating magnetic field is limited as a result. Furthermore, the output voltage does not need to be suppressed differently from the constant current drive circuit and thus the level of the alternating magnetic field can be raised to the maximum capacity of the transmitter 21.

In addition, according to the tablet 1 in accordance with the present embodiment, the filters 31 and 32 are disposed at previous stages of the amplifiers 33x and 33y. For this reason, the output voltage of the transmitter 21 can be prevented from temporarily becoming high at the rising and falling of the rectangular wave signal supplied from the control circuit 20 to the transmitter 21. Therefore, the amplification factor of the amplifying circuit 40 can be set high and thus the level of the alternating magnetic field can be raised. This point will be described in detail below.

Figure 6:
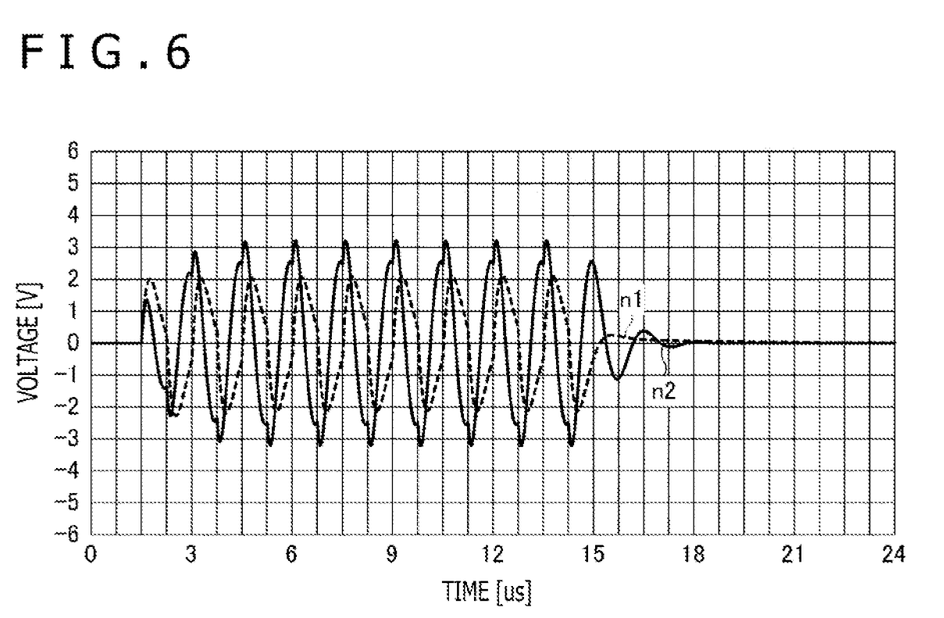
FIG. 6 is a diagram depicting a simulation result of a signal observed at each of nodes n1 and n2 according to an embodiment of the present disclosure.

FIG. 6 is a diagram depicting a simulation result of a signal observed at each of the nodes n1 and n2 in the present embodiment. Meanwhile, FIG. 7 is a diagram depicting a simulation result of a signal observed at each of the nodes n1 and n2 in the case in which the filters 31 and 32 are not disposed.

Figure 7:
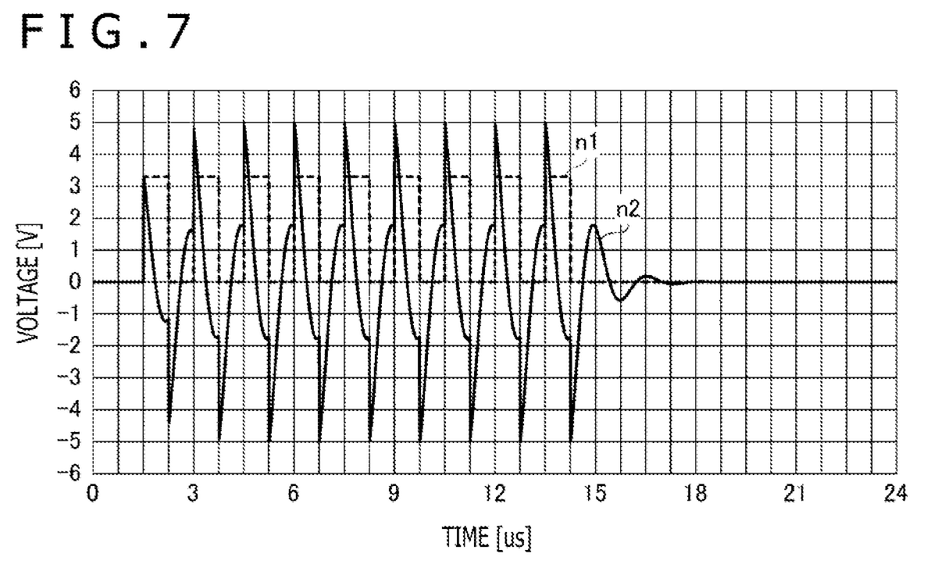
FIG. 7 is a diagram depicting a simulation result of a signal observed at each of the nodes n1 and n2 in the case in which filters 31 and 32 are not disposed.

First, when attention is paid to FIG. 7, the signal observed at the node n1 in this case is the rectangular wave signal itself supplied from the control circuit 20. A high-frequency component is included in the rectangular wave signal. Therefore, in the signal observed at the node n2 in this case, a transient high voltage is generated at the rising and falling of the rectangular wave signal as depicted in FIG. 7. Therefore, in order for the output voltage of the transmitter 21 not to surpass the rated voltage of the switches 23x and 23y, the need to suppress the amplification factor of the amplifiers 33x and 33y to a small value arises.

Next, when attention is paid to FIG. 6, the signal observed at the node n1 in this case is a signal close to a sine wave although being not a sine wave itself. As a result, a transient high voltage like that depicted in FIG. 7 does not appear in the signal observed at the node n2. Thus, it becomes possible to set the amplification factor of the amplifiers 33x and 33y to a larger value compared with the example of FIG. 7. That is, it becomes possible to raise the level of the alternating magnetic field.

Here, the reason why the base part of the signal observed at the node n2 in the example of FIG. 7 is a sine wave is that the series resonant circuit is configured due to the disposing of the capacitor 41 in the transmitter 21. In contrast, in the transmitter 21 according to the present embodiment, originally the input signal of the amplifiers 33x and 33y becomes a substantially sine wave signal. Thus, the output signal of the transmitter 21 can be set as the substantially sine wave signal without the series resonant circuit based on the capacitor 41. Therefore, the capacitor 41 is not essential but disposing the capacitor 41 can improve characteristics based on the inductance of the sensor coil LC.

Although the band-pass circuit is used for the filter 31 in the present embodiment, a low-pass circuit may be used instead of the band-pass circuit. However, in this case, a DC component is often superimposed on the signal observed at the node n1 and therefore attention is necessary. This point will be described below by taking a concrete example.

Figure 8:
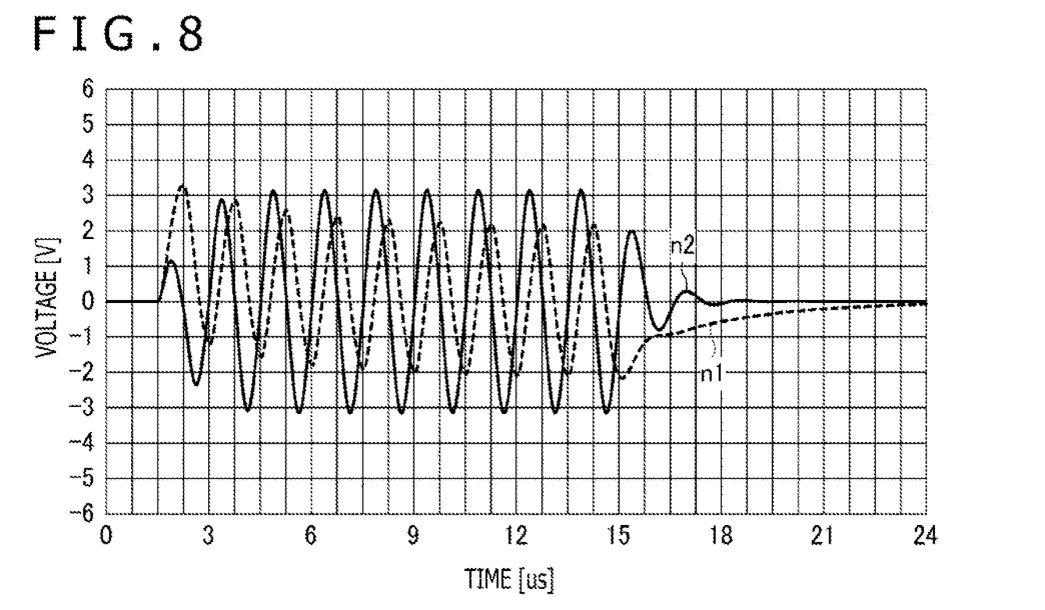
FIG. 8 is a diagram depicting a simulation result of a signal observed at each of the nodes n1 and n2 when the filter 31 is formed of a low-pass filter.

FIG. 8 is a diagram depicting a simulation result of a signal observed at each of the nodes n1 and n2 when the filter 31 is formed of a low-pass filter. As depicted in this diagram, a DC component is superimposed on the signal observed at the node n1 in this case particularly at the time of start of the transmission operation.

Such a DC component possibly becomes a cause of distortion of the output signal of the amplifying circuit 40. However, according to the amplifying circuit 40 in accordance with the present embodiment, distortion does not particularly appear in the signal observed at the node n2 as depicted in FIG. 8. This is an effect attributed to the configuration of the amplifying circuit 40 according to the present embodiment. A detailed description will be made below.

As depicted in FIG. 5, the amplifying circuit 40 according to the present embodiment has a reference potential setting part 40a that sets a reference potential that represents the amplitude center of a voltage-amplified signal to be output. In the concrete example, the reference potential setting part 40a is a ground line connected to the inverting input terminal of the operational amplifier through a resistive component. Due to the disposing of such a reference potential setting part 40a in the amplifying circuit 40, the amplitude center of the output signal of the transmitter 21 is fixed to the ground potential (=0 V) irrespective of whether or not superposition of a DC component on the input signal exists as depicted in FIG. 8 and FIG. 6. This means that distortion of the output signal of the transmitter 21 is alleviated. Therefore, it can be said that distortion of the output signal of the transmitter 21 is alleviated according to the configuration of the amplifying circuit 40 in accordance with the present embodiment.

It is preferable to set the reference potential setting part 40a in the amplifying circuit 40 also in the case of configuring the filter 31 by a band-pass circuit. This makes it possible to ensure that the amplitude center of the output signal of the transmitter 21 is the ground potential.

As described above, according to the tablet 1 in accordance with the present embodiment, because not the constant current drive circuit but the amplifying circuit 40 is used for the transmitter 21, the level of the alternating magnetic field can be improved compared with the case of using the constant current drive circuit. In addition, as described with reference to FIGS. 4A to 4C, although the sensor coil LC used for reception of the pen signal changes, the sensor coil LC used for transmission of the transmission signal does not change (above-described second scanning method). Thus, the level of the alternating magnetic field received by the stylus 2 can be kept constant. Therefore, it can be said that the level of the alternating magnetic field received by the stylus 2 can be made constant without using the constant current drive circuit and it becomes possible to carry out amplification with which use up to the limit of the rated voltage of the switches 23x and 23y is possible.

Furthermore, according to the tablet 1 in accordance with the present embodiment, the reference potential setting part 40a is set in the amplifying circuit 40 and thus distortion of the output signal of the transmitter 21 is alleviated.

Although the preferred embodiment of the present disclosure is described above, it is obvious that the present disclosure is not limited to such an embodiment at all and the present disclosure can be carried out in various modes without departing from the gist thereof.

For example, in the above-described embodiment, the example in which the sensor coils LC used for reception are used also for transmission is described. However, the sensor coils LC for transmission and the sensor coils LC for reception may be separately disposed and the sensor coil group 12 may be configured as the aggregate of them. In this case, for example, each of a substrate on which the sensor coils LC for transmission are formed on a surface and a substrate on which the sensor coils LC for reception are formed on a surface may be disposed over the display surface of the display device 11.

What is claimed is:

1. A tablet that supplies energy to a stylus including a resonant circuit including a coil and a capacitor by using an alternating magnetic field, the tablet comprising:

a first sensor coil group including a plurality of first sensor coils;

a first switch connected to each of the first sensor coils at one end in a first direction;

a second sensor coil group including a plurality of second sensor coils;

a second switch connected to each of the first sensor coils at one end in a second direction;

a receiver connected to the first switch and the second switch, and which, in operation, receives a pen signal that is transmitted by the stylus and provided to the first sensor coil group through the first switch and provided to the second sensor coil group through the second switch;

a transmitter connected to the first switch and the second switch, and which, in operation, generates the alternating magnetic field by supplying a signal to at least one of the first sensor coil group through the first switch and the second sensor coil group through the second switch; and a control circuit connected to each of the first switch, the second switch, the receiver, and the transmitter, and which, in operation, supplies a transmission signal to the transmitter and receives input of the pen signal from the receiver, wherein the transmitter includes:

a band-pass filter which, in operation, receives a rectangular-wave transmission signal from the control circuit and suppresses a transient phenomenon that occurs at the rising and falling of the rectangular-wave signal, a high pass filter which, in operation, passes high-frequency components of the transmission signal filtered by the band-pass filter;

a first amplifying circuit connected to the first switch through a first capacitor connected between an output terminal of the first amplifying circuit and an input terminal of the first switch;

a second amplifying circuit connected to the second switch through a second capacitor connected between an output terminal of the second amplifying circuit and an input terminal of the second switch;

wherein the transmitter, in operation, alternately supplies each of the first sensor coil group and the second sensor coil group with a voltage-amplified signal obtained by amplifying a voltage of the transmission signal supplied from the high-pass filter in such a manner that a maximum amplitude of the voltage falls within a rated voltage of the first switch and the second switch, and wherein the control circuit, in operation, performs a first control operation that controls one of the first switch and the second switch to cause one of the plurality of first sensor coils and the plurality of second sensor coils to be connected to the receiver and a second control operation that controls one of the first switch and the second switch to cause at least one predetermined sensor coil of the plurality of first sensor coils and the plurality of second sensor coils to be connected to the transmitter.

2. The tablet according to claim 1, wherein:
each of the first amplifying circuit and the second amplifying circuit is coupled to a reference potential that is set as an amplitude center of the voltage-amplified signal.

3. The tablet according to claim 1, wherein:
the at least one predetermined sensor coil is one predetermined sensor coil.

4. The tablet according to claim 3, wherein:
the tablet includes a display device in which a plurality of scan lines is disposed, each of the scan lines extending along the first direction in a display surface,
the plurality of first sensor coils and plurality of second sensor coils are in the display surface, and
the at least one predetermined sensor coil includes one of the plurality of first sensor coils.

5. The tablet according to claim 1, wherein:
the tablet includes a display device including a display surface, and
the plurality of first sensor coils and the plurality of second sensor coils are in the display surface.

6. The tablet according to claim 5, wherein:
the at least one predetermined sensor coil includes one of the plurality of first sensor coils and one of the plurality of second sensor coils.

7. The tablet according to claim 1, wherein:
the first capacitor forms a first series resonant circuit with each of the plurality of first sensor coils, and
the second capacitor forms a second series resonant circuit with each of the plurality of second sensor coils.

8. The tablet according to claim 1, wherein:
the tablet includes a display device including a display surface, and
the plurality of first sensor coils and the plurality of second sensor coils are in the display surface.

9. The tablet according to claim 8, wherein:
the first capacitor forms a first series resonant circuit with each of the plurality of first sensor coils, and
the second capacitor forms a second series resonant circuit with each of the plurality of second sensor coils.

* * * * *